No. 747,499. PATENTED DEC. 22, 1903.
O. J. R. STRÖM.
CENTRIFUGAL LIQUID SEPARATOR.
APPLICATION FILED JUNE 16, 1903.
NO MODEL.
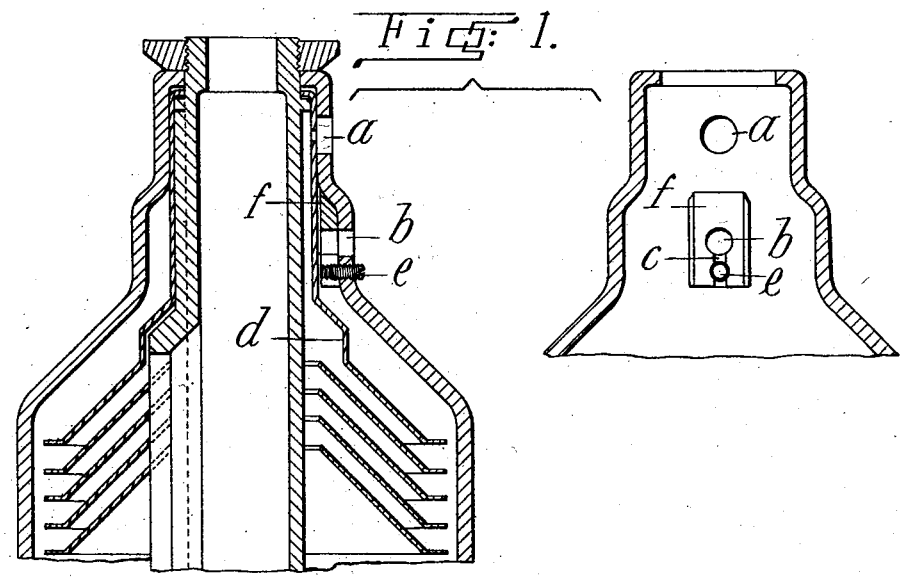
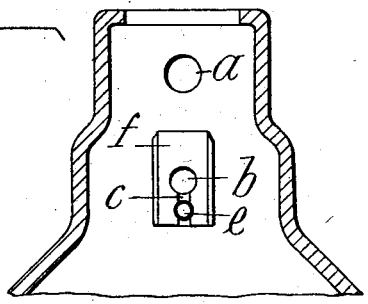
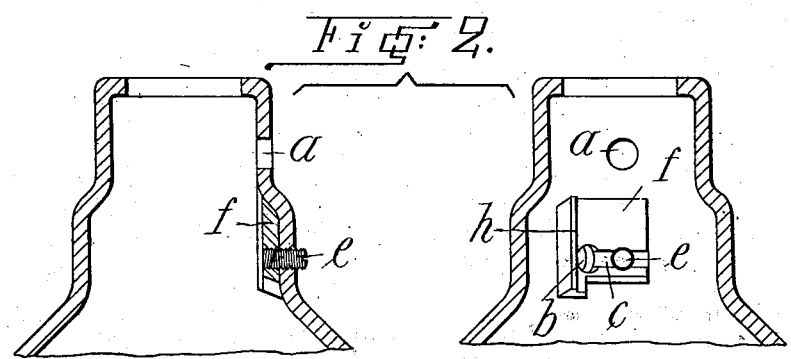
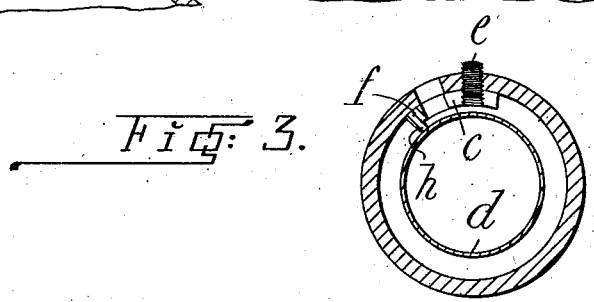
WITNESSES
INVENTOR
Ossian Johan Robert Ström
ATTORNEYS No. 747,499. Patented December 22, 1903.

UNITED STATES PATENT OFFICE.

OSSIAN JOHAN ROBERT STRÖM, OF STOCKHOLM, SWEDEN.

CENTRIFUGAL LIQUID-SEPARATOR.

SPECIFICATION forming part of Letters Patent No. 747,499, dated December 22, 1903.

Application filed June 16, 1903. Serial No. 161,954. (No model.)

*To all whom it may concern:*

Be it known that I, OSSIAN JOHAN ROBERT STRÖM, engineer, of St. Eriksplan 4, Stockholm, in the Kingdom of Sweden, do hereby declare the nature of my invention for Improvements in Centrifugal Liquid-Separators, and in what manner the same is to be performed, to be particularly described and ascertained in and by the following statement.

It is well known that in milk and cream separators the cream is usually discharged through an aperture at the upper part of the neck of the drum, while the milk discharges through an aperture lower down in the wide part of the neck, in which latter aperture a threaded nozzle is inserted which can be screwed in more or less deep for controlling the quantity of skim-milk (and consequently of cream) discharged. The aperture in this nozzle in this case must be made large enough to allow the entire quantity of skim-milk to pass readily out therethrough. The layers of milk and cream are kept separated on their way to the discharge-orifices by means of an "upper plate," which is conical at the bottom and cylindrical at the top and inserted in the neck of the drum. As the difference between the cream and milk levels is very small, the slightest alteration of the position of nozzle will cause a very considerable variation in the quantity of cream discharged, or, in other words, the cream control will be too sensitive and the inner end of the nozzle will be too close to the upper plate, and as a consequence it may easily happen (if the nozzle be screwed in too far) that the milk is prevented from passing out of the nozzle and instead of finding its way up between the neck of the drum and the extreme end of the said plate will discharge through the cream-outlet, all control of the process being thus lost. For instance, if the nozzle be so adjusted that eight per cent. of cream were to discharge it may easily happen that the actual cream discharge, owing to the rise of milk by the path just mentioned, will instead prove to be twelve per cent., for instance. When examining in this case the percentage of fatty matter in the skim-milk, this will be found to be too high, since in reality not twelve per cent. but eight per cent. of cream has been obtained, the remainder being skim-milk, and the percentage of fatty matter in the skim-milk is increased according as less or thicker cream is obtained. The contrivance just described, therefore, not only is too sensitive, but also very unreliable. To remedy its defects is the object of the device here in question, which is illustrated in two different forms in Figures 1 and 2, showing vertical sections of the upper portion of a separating-drum of the present invention.

The device has for purpose to prevent the skim-milk rising to and passing out of the cream-outlet $a$ and to make the controlling operation less sensitive to the position of the device by means of which the milk discharge (and consequently the cream quantity) is controlled. For this purpose it is in the first place advisable to make the diameter of the neck of the drum at the part where the milk-outlet is located larger than heretofore in order to produce a greater discharging velocity of the milk. In this part of the neck, moreover, a passage $c$, leading to the milk-outlet $b$, is arranged, which passage may be formed by an inverted-U-shaped piece $f$, fitted about the inside of said outlet close to the inside of the neck. In the end of the passage $c$ farthest away from the outlet $b$ is the inner end of a solid adjusting-screw $e$, passing through the neck and by which as it is screwed in more or less the depth of the passage can be varied. By this device the skim-milk passage $c$ can obtain slight width, while at the same time the discharging skim-milk layer can be made deeper, which of course considerably decreases the sensitiveness of the screw $e$. To prevent the milk from rising between the upper plate $d$ and the neck to the cream-outlet $a$, the inner edges of the passage $c$ should be located slightly outside the inner side of the portion of the neck where the outlet $a$ is situated, since in case of a rise in the milk-level the entire milk quantity can pass out of the milk-outlet $b$, which is always open.

In place of locating the screw $e$ beneath the milk-outlet $b$ it may, as shown in Fig. 2, be placed at one side of the former in the same horizontal level. This arrangement possesses the advantage that any milk leaking out at the screw will flow out into the skim-milk reservoir and that an adjustment of the drum vertically will be possible, which would frequently not be the case when the screw is located beneath the outlet $b$, since the screw will then come so low down that when the drum is lowered it will fall beneath the said reservoir, and consequently the skim-milk leaking past the screw cannot be collected.

Fig. 3 is a horizontal section through the neck of the drum and illustrates the piece $f$ provided with a shoulder or wing $h$ at the rear edge, which wing has for its purpose to put the thin milk layer nearest the upper plate in movement.

Having now particularly described and ascertained the nature of my said invention and in what manner the same is to be performed, I declare that what I claim is—

1. In a centrifugal liquid-separator, the combination with an upper plate $d$ of a regulating-piece $f$ arranged on the neck of the drum in the annular discharge-passage between the said neck and the "upper plate," said piece being provided with a recess or passage $c$ embracing with one of its ends the outlet $b$ for the skim-milk and with its other end a controlling-screw $e$ adjustable so as to vary the depth of the passage.

2. In a centrifugal liquid-separator, the combination with an upper plate $d$ of a regulating-piece $f$ arranged on the neck of the drum, in the annular discharge-passage, formed between the said neck and the "upper plate" said piece being provided with a recess or passage embracing with one of its ends the outlet for the skim-milk and with its other end a controlling-screw, and also with a wing or shoulder at its rear edge.

In witness whereof I have hereunto set my hand in presence of two witnesses.

OSSIAN JOHAN ROBERT STRÖM.

Witnesses:
DAVID SHEDIN,
H. ZIMMER.